United States Patent Office 2,761,543
Patented Sept. 4, 1956

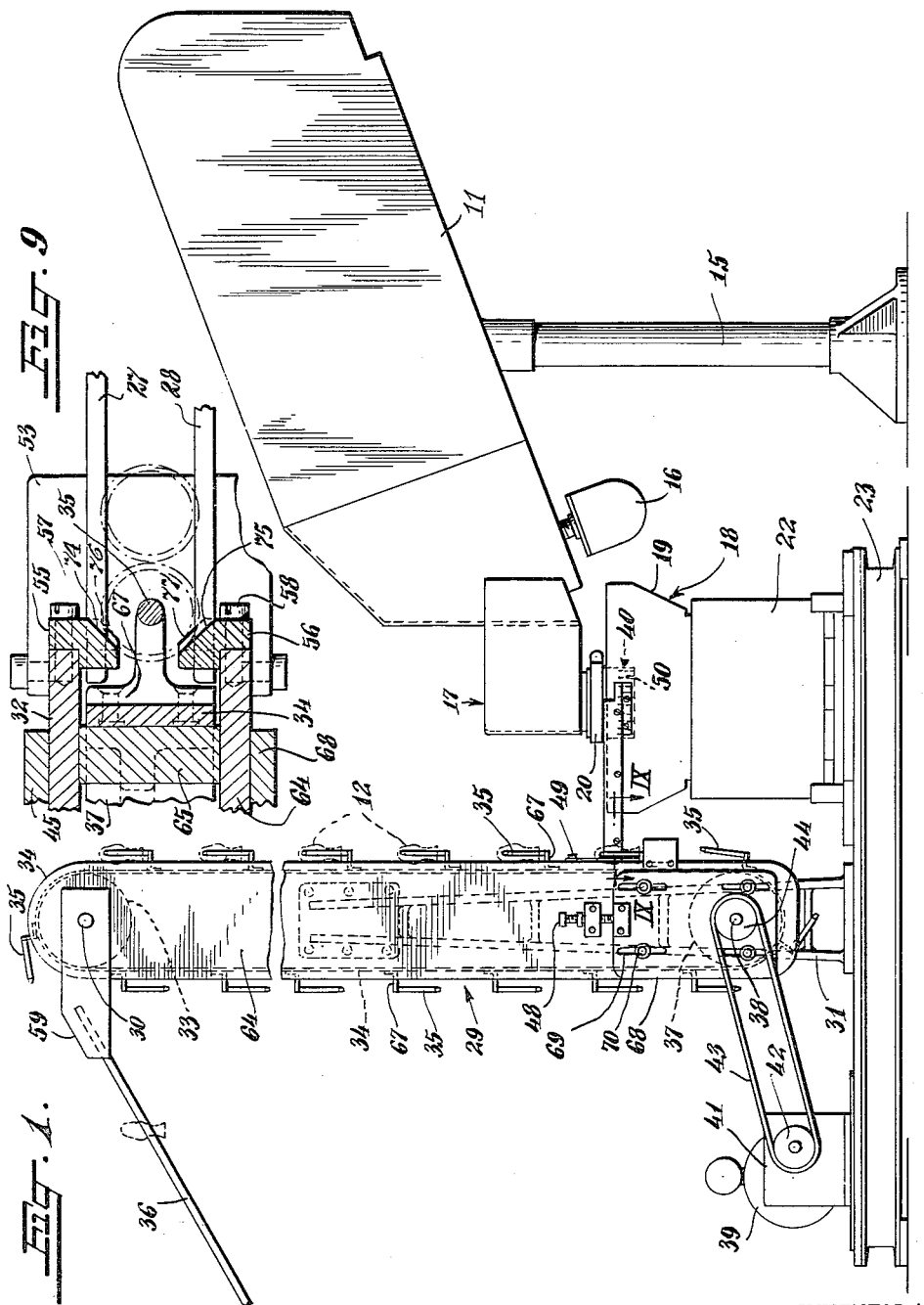

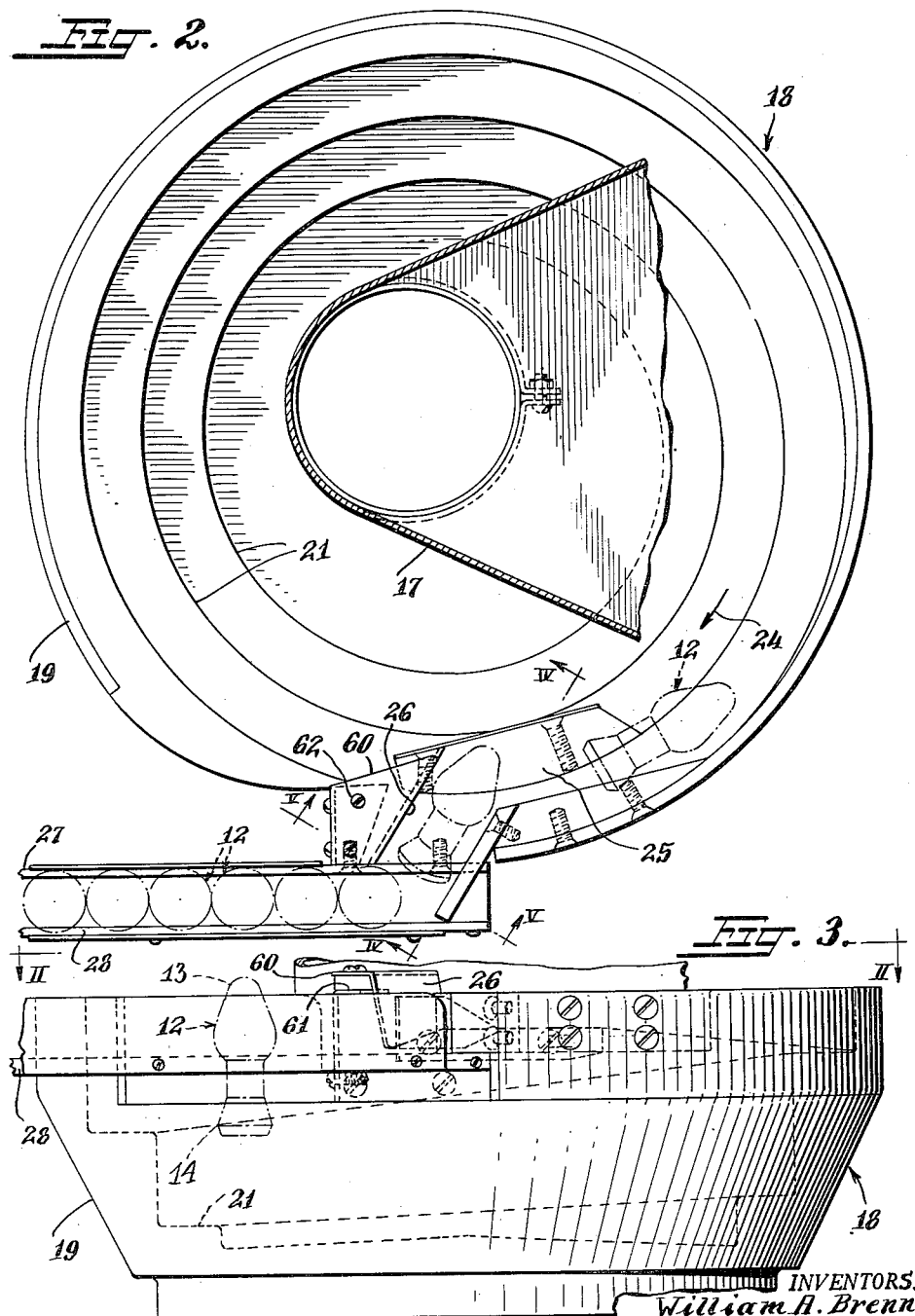

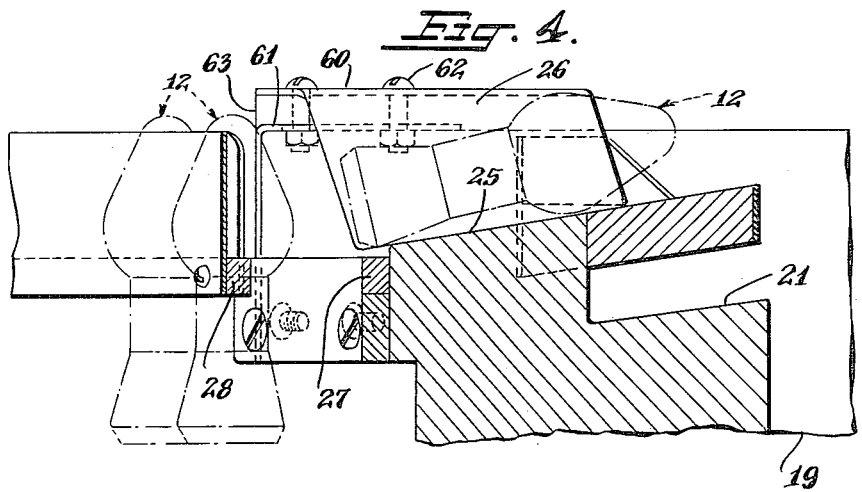
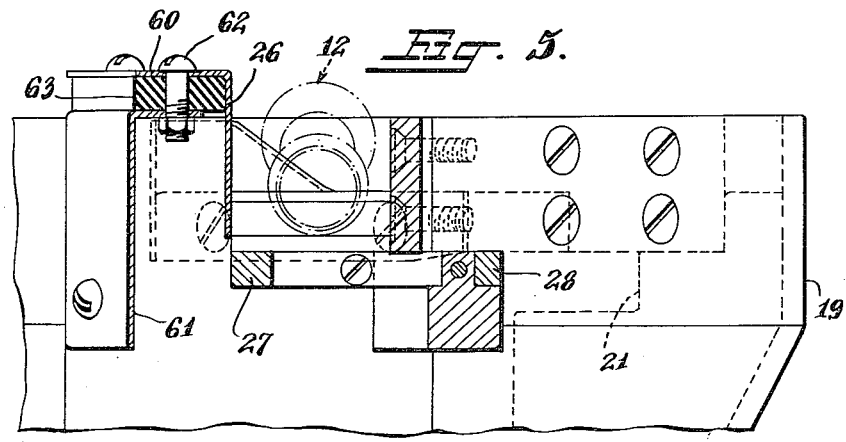
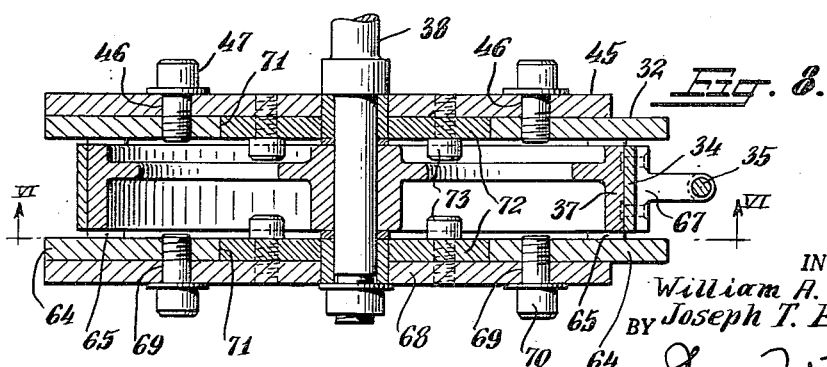

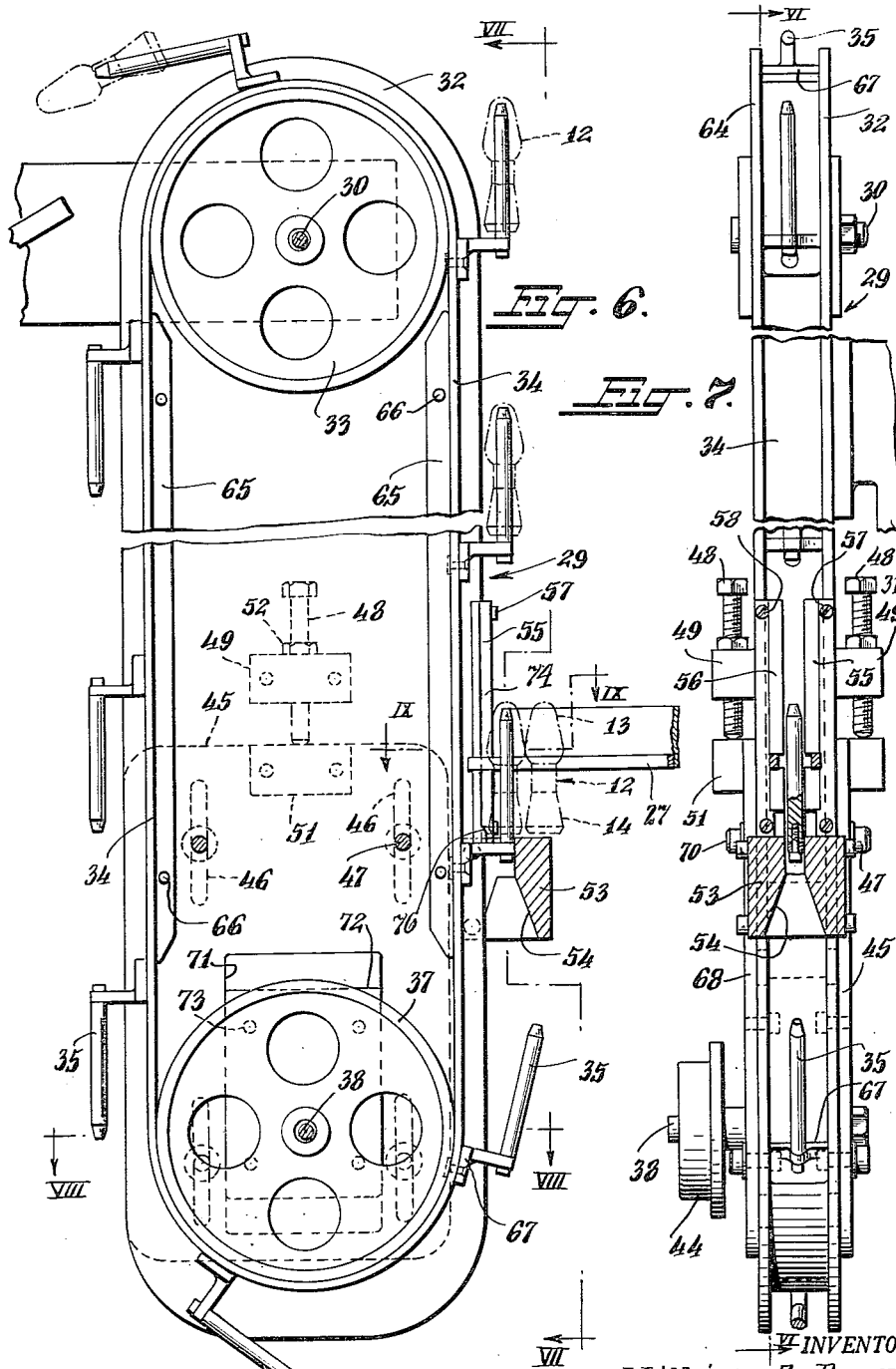

1

2,761,543

GLASS BULB CONVEYOR

William A. Brenneck, West Caldwell, and Joseph T. Emerson, Springfield, N. J., assignors to Westinghouse Electric Corporation, East Pittsburgh, Pa., a corporation of Pennsylvania Application May 15, 1953, Serial No. 355,246

7 Claims. (Cl. 198—33)

This invention relates to a machine for feeding open neck lamp bulbs to a gravity track for transfer to a sealing machine.

The principal object of our invention, generally considered, is to orient the axes of and feed open flared-neck lamp bulbs, of the type in which the maximum bulb diameter is greater than the maximum diameter at the neck or cullet, and in which there is more weight toward the cullet end from the bulb section of maximum diameter, than toward the tip or closed end of the bulb, to a gravity track from where said bulbs may be transported to a sealing machine.

Another object of our invention is to provide a machine comprising pulleys over which travel a lug-carrying belt, for transporting such bulbs from a hopper to the top of a chute inclined sufficiently to cause the bulbs to slide to position for transfer to a sealing machine.

A further object of our invention is to provide a bulb conveyor comprising a hopper, a vibratory feeder to which bulbs are fed from said hopper, especially designed tracks to which said feeder discharges and from which bulbs held upen-end down are picked up, pins on the belt of a conveyor carried vertically up to engage in the open ends of said bulbs, one by one, raise them to the top of said conveyor and drop them on a chute on which they slide by gravity to a "sealex" machine.

A still further object of our invention is to provide a conveyor, as above described, in which the gravity feed rails are spaced a sufficient distance for the neck or cullet section of the bulb, but not enough for the bulb section, to pass therebetween, whereby said bulbs are delivered closed end up to position for engagement by a vacuum pick-up and swinging arm, or other device, for unloading and feeding to a sealing machine.

Other objects and advantages of our invention will become apparent as the description proceeds.

Referring to the drawing, in which like parts are designated by like reference characters:

Figure 1 is an elevational view of a conveyor embodying our invention.

Figure 2 is a plan, with a part in section on the line II—II of Fig. 3, of a part of the conveyor shown in Figure 1.

Figure 3 is an elevational view of the part of the conveyor shown in Figure 2.

Figures 4 and 5 are sectional views, on the correspondingly numbered lines of Figure 2, in the directions of the arrows.

Figure 6 is an enlarged fragmentary vertical sectional view on the line VI—VI of Fig. 8, of the left hand portion of the machine, as shown in Figure 1.

Figure 7 is a vertical sectional view, on the line VII—VII of Figure 6, in the direction of the arrows.

Figure 8 is a horizontal sectional view on the line VIII—VIII of Figure 6, in the direction of the arrows.

Figure 9 is a horizontal sectional view on the lines IX—IX of Figures 1 and 6, in the direction of the arrows.

The machine, to be now described in detail, is an improvement over that disclosed and claimed in the Kirby et al. application, Ser. No. 280,334, filed April 3, 1952. It includes a desirably sheet metal hopper 11 into which bulbs 12 are loaded. The bulbs handled by this machine are the type in which the maximum diameter of the closed portion 13 of the bulb is greater than the maximum diameter at the flared open neck portion 14. The bulbs are preferably caused to feed from the hopper 11, which is carried by a standard or pedestal 15, by means of a conventional vibrator 16 carried by the lower wall of said hopper. Said bulbs desirably pass through a preferably metal discharge funnel 17 into vibrating feeder mechanism 18.

The funnel 17 desirably has secured around its discharge spout, as by means of a metal band 20, an encircling bulb deflector of soft rubber or similar resilient sheet material 40. The lower edge of said sheet has cuts 50 therein. This construction provides for smoothly guiding the bulbs from the funnel to the mechanism 18 and avoids contact between said bulbs and the lower edge of the metal funnel 17.

The mechanism 18 includes a receptacle 19 having a spiral upwardly-extending track 21 for guiding the bulbs upwardly and outwardly while under the influence of a vibrator 22, desirably of the "Syntron" type, carried on the base 23 of the conveyor mechanism. Operation of the vibrator causes the bulbs to creep along the track, while disposed on their sides, in the direction indicated by the arrow 24 in Fig. 2, either closed end forward, or open end forward. When they reach the outlet guide member 25, they are safely deflected by a flange 26. Said flange depends from a plate 60 resiliently secured to a bracket portion 61 of the machine, as by means of bolts 62 passing through a soft rubber pad 63, to cause said bulbs to pass out of the feeder. Their neck portions then drop between feed rails 27 and 28, thereby causing them to stand upright and be pushed along by the oncoming bulbs toward the belt-conveyor device 29.

The device 29 comprises a mounting bracket 31 upstanding from the base 23 and carrying a frame or side plate 32, spaced from an associated side plate 64 by side spacers 65 and secured to said side plate by bolts 66 passing through said plates and spacers. A pin 30 extends between the upper portions of said side plates. On said pin and between said plates is pivoted a pulley 33, over which passes a conveyor belt 34. To said belt is secured a series of angular lugs 67, each of which carries a hook or pin 35, forming pick-up means for transporting bulbs from the vibrating mechanism 18.

The belt 34 is guided by the side spacers 65 and the side plate portions therebeyond. It is driven by passing around a pulley 37, mounted between side plates 45 and 68 on a shaft 38, the end portions of which are journalled in said plates, which are external of the plates 32 and 64. The shaft 38 is driven by an electric motor or other source of power 39, through gears in a box 41 and drive pulley 42. The drive pulley 42 is connected to the shaft 38 through belt 43 and driven pulley 44 on said shaft.

Adjustment of the tightness of the belt 34 is allowed for by having the plates 45 and 68 which carry the shaft 38 slidable with respect to the plates 32 and 64 which carry the pin 30 on which the pulley 33 is pivoted. The plates 45 and 68 are slotted, as indicated at 46 and 69, and adjustably receive bolts 47 and 70 threaded into corresponding apertures in the plates 32 and 64. Coaxial relative movement is insured by forming a rectangular slot 71 in each of the plates 32 and 64 and securing to each of the plates 45 and 68 a rectangular plate 72, accurately slidable vertically in the corresponding slot 71, as by means of tap bolts 73.

An adjusting bolt 48, is desirably threaded through a block 49 secured to each of the plates 32 and 64, and engages a block 51 secured to each of the plates 45 and 68. Thus, turning of the bolts 48, before fully tightening of the bolts 47 and 70, effects corresponding relative movement between the plates 45 and 32 on one side, and 68 and 64 on the other. Upon producing a desired tightness in the belt 34, the bolts 48 may be locked in place by the nuts 52.

In order to insure that each pin 35 is accurately received in each bulb 12, when it reaches the end of its travel between the transfer rails 27 and 28, not only is the end bulb accurately stopped in a position to be picked up, as shown in Figs. 6 and 9, but a guide block 53 is provided immediately therebeneath to insure that the end of each pin accurately feeds directly beneath and into said bulb. This effect is obtained by providing a flaring opening 54 in the block for, if necessary, guiding the top end of said pin 35, from the lowermost position, represented at the right of the pulley 37 in Fig. 6, to the position immediately thereabove where said pin is shown fitting a bulb 12 being picked up.

Operation

The hopper 11 is provided with a supply of bulbs 12 of the character specified. The motor 38 is placed in operation, causing a rotation of the pulleys 33 and 37, upward movement of the right hand section of the belt 34, and corresponding downward movement of the left-hand section. The vibrators 16 and 22 are also placed in operation. This agitates the bulbs in the hopper 11, causing them to feed through the funnel 17 to the vibrating mechanism 18, where said bulbs creep one by one along the spiral path 21 and out between the transfer rails 27 and 28.

Such movement of the bulbs 12 is stopped in the extreme left-hand position, as viewed in Fig. 9, by engagement with blocks 55 and 56 held in adjusted position by means of set screws 57 and 58. When in this position each bulb, at its larger diameter, engages the inclined faces 74 and 75, of the blocks 55 and 56, respectively, which are set back the proper distance compared with the inclined faces 76 and 77 of said blocks which are engaged by the necks or bulb portions of smaller diameter, as viewed in Figs. 6 and 9, so that each bulb stands upright in proper position to be picked up, one by one, as the moving pins 35 of the belt 34 pass thereinto. These pins carry them over the top of the pulley 33 and discharge them onto the gravity carrying rails 36 on which they stand upright. Such rails 36 may be supported by plates 59 extending laterally from the conveyor plates 32 and 64.

From the foregoing it will be seen that we have provided improved means for carrying bulbs from a hopper, through a vibrating feeder and vertical conveyor, to a gravity feed, where they move to the exact location desired for transfer to a sealing machine.

Although a preferred embodiment has been described, it will be understood that modifications may be made within the spirit and scope of the invention.

We claim:

1. An automatic conveyor for orienting the axes of and feeding open flared-neck lamp bulbs, in which the maximum bulb diameter is greater than the maximum neck diameter, to a gravity track on which they stand upright, comprising a bulb-supplying device, between spaced plate portions of which bulbs are moved, a pair of conveyor wheels, continuous flexible conveyor means passing over said wheels, lugs carried by said conveyor means for engaging bulbs between said plate portions, so that they serve to carry said bulbs therewith, feed rails, spaced to allow the bulb necks to drop therebetween and catch said bulbs adjacent their portions of maximum diameter, positioned to receive bulbs discharged from the upper end of said conveyor means and deliver them closed ends up to a position where they may be picked up and transported to a sealing machine, and power means for driving said wheels to cause the conveyor means to carry bulbs from the supplying device and deliver them to said gravity track.

2. An automatic conveyor for orienting the axes of and feeding open flared-neck bulbs, in which the maximum bulb diameter is greater than the maximum neck diameter, comprising a bulb-supplying device, between spaced portions of which bulbs are moved, a pair of conveyor wheels, continuous flexible conveyor means passing over said wheels, means carried by said conveyor means for engaging bulbs between said spaced portions, so that they serve to carry said bulbs therewith to the top of said conveyor means, and gravity track rails spaced to allow the bulb necks to drop therebetween and catch said bulbs adjacent their portions of maximum diameter so as to hold them upright, positioned to receive bulbs discharged from the upper end of said conveyor means and deliver them closed ends up to a position where they may be picked up and transported to a sealing machine.

3. An automatic conveyor for feeding open flared-neck bulbs, in which the maximum bulb diameter is greater than the maximum neck diameter, to a gravity track on which they stand upright, comprising a bulb-supplying device, between spaced portions of which the necks of said bulbs drop and are moved, a pair of conveyor wheels, continuous flexible conveyor means passing over said wheels, and means carried by said conveyor means for engaging bulbs in said supplying device and carrying them, while axially alined in the direction of travel, to the top of said conveyor means.

4. An automatic conveyor for orienting the axes of and feeding open flared-neck lamp bulbs, in which the maximum bulb diameter is greater than the maximum neck diameter, comprising a hopper, vibrating feed mechanism positioned to receive bulbs from said hopper, said mechanism comprising a receptacle having a spiral upwardly inclined outwardly expanding path, a vibrator connected to said receptacle and operable to cause bulbs therein to creep up and out along said path, feed rails for guiding said bulbs from said receptacle, said rails being so spaced that they hold the closed portion of each bulb while allowing the neck portion to drop therebetween, and pick-up means passing up into the open necks of said bulbs for transporting them to a gravity track.

5. An automatic conveyor for orienting the axes of and feeding open flared-neck lamp bulbs, in which the maximum bulb diameter is greater than the maximum neck diameter, comprising side plates, side spacers, bolts passing through said spacers and connecting said plates, pulleys rotatable between said plates, a belt passing over said pulleys and guided by said spacers and between said plates, spaced pins carried by said belt and axially aligned in the direction of movement between said pulleys, and means for delivering bulbs closed end up into the path of the movement of said pins which enter the open necks thereof, whereby said bulbs are picked up one by one by said conveyor and carried axially to its top.

6. An automatic conveyor for orienting the axes of and feeding open flared-neck lamp bulbs, in which the maximum bulb diameter is greater than the maximum neck diameter, comprising a hopper, means for vibrating said hopper to cause bulbs to gravitate therefrom, a discharge funnel through which said bulbs will feed as they pass out of said hopper, vibrating feed mechanism positioned to receive bulbs from said funnel, said mechanism comprising a receptacle having a spiral upwardly-inclined outwardly expanding path, a vibrator connected to said receptacle and operable to cause bulbs therein to creep up and out along said path, feed rails for guiding said bulbs from said receptacle, a belt conveyor comprising pulleys, a belt passing over said pulleys, spaced pins carried by said belt, means for driving said pulleys to cause said pins to remove said bulbs one by one from said feed rails and carry them to the top of said conveyor, and gravity track rails for receiving said bulbs one by one as they are lifted over the top of said conveyor and inverted in position.

7. An automatic conveyor for orienting the axes of and feeding open flared-neck lamp bulbs, in which the maximum bulb diameter is greater than the maximum neck diameter, comprising a hopper, means for vibrating said hopper to cause bulbs to gravitate therefrom, a discharge funnel through which said bulbs will feed as they pass out of said hopper, a rubber divided skirt fringing the lower edge of said funnel, vibrating feed mechanism positioned to receive bulbs from said funnel, said mechanism comprising a receptacle having a spiral upwardly-inclined outwardly expanding path, a vibrator connected to said receptacle and operable to cause bulbs therein to creep up and out along said path, feed rails for guiding said bulbs from said receptacle, said rails being so spaced that they hold the closed portion of each bulb while allowing the neck portion to drop therebetween, resilient means for deflecting said bulbs from said receptacle to said rails, a belt conveyor comprising side plates, side spacers, bolts passing through said spacers and connecting said plates, pulleys rotatable between said plates, a belt passing over said pulleys and guided by said spacers and between said plates, spaced pins carried by said belt, means for driving said pulleys to cause said pins to remove said bulbs one by one from said transfer rails and carry them to the top of said conveyor, and gravity track rails for receiving said bulbs one by one as they are lifted over the top of said conveyor and inverted in position.

References Cited in the file of this patent

UNITED STATES PATENTS

| | | |
|---|---|---|
| 803,850 | Prince | Nov. 7, 1905 |
| 1,862,351 | Hagiware | June 7, 1932 |
| 2,609,914 | Balsiger | Sept. 9, 1952 |
| 2,661,833 | Spurlin | Dec. 8, 1953 |

FOREIGN PATENTS

| | | |
|---|---|---|
| 935,732 | France | June 29, 1948 |